(12) United States Patent
Pietri et al.

(10) Patent No.: US 8,510,494 B2
(45) Date of Patent: Aug. 13, 2013

(54) USB 3.0 SUPPORT IN MOBILE PLATFORM WITH USB 2.0 INTERFACE

(75) Inventors: Pierre-Jean Pietri, Annecy le Vieux (FR); Peter Thomsen, Chambesy (CH); Morten Christiansen, Arendal (NO)

(73) Assignee: ST-Ericsson SA, Plan-les-Ouates ( * ) Notice: Subject to any disclaimer, the term of this patent is extended or adjusted under 35 U.S.C. 154(b) by 143 days.

(21) Appl. No.: 12/861,232

(22) Filed: Aug. 23, 2010

(65) Prior Publication Data

US 2011/0161530 A1 Jun. 30, 2011

Related U.S. Application Data

(60) Provisional application No. 61/290,146, filed on Dec. 24, 2009.

(30) Foreign Application Priority Data

Jan. 19, 2010 (EP) .................................. 10368007

(51) Int. Cl.
*G06F 13/20* (2006.01)
*G06F 13/00* (2006.01)

(52) U.S. Cl.
USPC ................ 710/313; 710/316; 710/29; 710/36

(58) Field of Classification Search
USPC .......................... 710/305–317, 29–32, 36–38
See application file for complete search history.

(56) References Cited

U.S. PATENT DOCUMENTS

| | | | |
|---|---|---|---|
| 6,890,188 B1 | 5/2005 | Le | |
| 7,051,149 B2 | 5/2006 | Wang et al. | |
| 7,152,190 B2 * | 12/2006 | Overtoom | 714/44 |
| 7,454,530 B2 | 11/2008 | Cahill et al. | |
| 7,565,467 B2 * | 7/2009 | Nagase | 710/62 |
| 7,788,428 B2 * | 8/2010 | Melin | 710/62 |
| 7,873,774 B2 * | 1/2011 | Orishko et al. | 710/313 |
| 7,921,233 B2 * | 4/2011 | Chung | 710/15 |

(Continued)

FOREIGN PATENT DOCUMENTS

EP 2073128 6/2009

OTHER PUBLICATIONS

Vinit. "Active Atomix SuperSpeed USB 3.0 adapter upgrades your USB 2.0 system to USB 3.0 system!" posted Jan. 13, 2010, pp. 2-4, <URL: http://www.pclaunches.com/other_stuff/ active_atomix_superspeed_usb_30_adapter_upgrades_your_usb_20_system_to_usb_30_system.php>.

(Continued)

*Primary Examiner* — Christopher Shin
(74) *Attorney, Agent, or Firm* — Coats & Bennett, P.L.L.C.

(57) ABSTRACT

Memory associated with a mobile communication device, such as memory removably inserted into a memory card slot, may be accessed, in the alternative, by a mobile communication platform or by a remote USB host. A memory access module connected to the memory card slots is operative in one of two modes: a pass-through mode and a USB mode. In the pass-through mode, the memory card slots are directly connected, via switching circuits, to memory interfaces on the mobile communication platform. A USB interface on the mobile communication platform may additionally be connected, in pass-through mode, via a USB hub to a remote USB host. In the USB mode, the memory card slots are connected, via switching circuits, second memory interfaces, and a controller, to a USB hub supporting USB 3.0 transfer protocols, and accessible by a remote host.

7 Claims, 6 Drawing Sheets

(56) References Cited

U.S. PATENT DOCUMENTS

| | | | |
|---|---|---|---|
| 7,921,244 B2 * | 4/2011 | Chang et al. | 710/62 |
| 8,051,229 B2 * | 11/2011 | Hubert et al. | 710/74 |
| 8,060,670 B2 * | 11/2011 | Yu et al. | 710/62 |
| 2006/0020720 A1 | 1/2006 | Stallmo et al. | |
| 2008/0071963 A1 | 3/2008 | Chow et al. | |
| 2009/0004920 A1 | 1/2009 | Hubert et al. | |
| 2009/0088024 A1 | 4/2009 | Ling et al. | |
| 2009/0248924 A1 | 10/2009 | Melin | |

OTHER PUBLICATIONS

Jeff Salton. "USB 3.0 ExpressCard 2-port adpater makes upgrading to USB 3.0 easy." Dec. 6, 2009, pp. 1-5, <URL:http://www.gizmag.com/usb-30-expresscard-adapter/13526/>.

* cited by examiner

USB 3.0 SUPPORT IN MOBILE PLATFORM WITH USB 2.0 INTERFACE

This application claims priority from U.S. provisional patent application Ser. No. 61/290,146, filed Dec. 24, 2009, titled "USB 3.0 Support in Mobile Platform with USB 2.0 Interface," and EP provisional patent application 10368007, filed Jan. 19, 2010, titled "Technique for interconnecting functional modules of an apparatus," both of which are incorporated herein in their entireties.

TECHNICAL FIELD

The present invention relates generally to mobile communication devices, and in particular to a system and method for providing memory access to a device having a mobile platform with a USB 2.0 interface, by a remote host using USB 3.0 protocol.

BACKGROUND

Mobile communication devices are ubiquitous. Although predominantly cellular telephones, including "smart phones," the broad classification of mobile communication devices additionally includes Personal Digital Assistants (PDA), portable computers, electronic book readers, and similar electronic devices having communication capabilities, as well as mobile embedded communication devices such as vehicle tracking systems. Many modern mobile communication devices are operative to transmit, receive, store, retrieve, and display/render a broad array of digital content, including text, graphics, images, and audio/video content. Such digital content can be voluminous, and many mobile communication devices are designed to include removable data storage devices, to store and transfer digital content. Additionally, mobile communication devices are often designed with one or more data transfer interfaces. A brief overview of some of these technologies is presented below.

Flash memory is non-volatile, solid state data storage medium. Technically a type of EEPROM, NAND type flash (the most commercially common form of flash memory) is not usually byte-programmable, but must be read, written, and erased on a block basis. Additionally, wear leveling (dynamically remapping the physical memory to evenly spread physical write/erase cycle stress), bad block mapping, and other functions unique to NAND flash memory often require a dedicated memory interface for mass storage devices utilizing NAND flash as a storage medium.

The MultiMedia Card (MMC) is a flash memory card standard that defines the physical dimensions and operational characteristics of a small, removable mass storage device employing NAND flash memory. eMMC embedded memory combines NAND flash memory and a high-speed MMC controller in a standard package. eMMC simplifies system design by freeing a host processor from low-level flash memory management tasks. SD/MMC (Secure Digital) is another standard based on the MMC form factor, which also combines flash memory with an embedded memory controller. The SD controller provides Digital Rights Management (DRM) support. The original SD/MMC cards had a maximum data capacity of 4 GiB. Later developments to the SD standard include SD High Capacity (SDHC), capable of storing up to 32 GiB, and SD Extended Capacity (SDXC), capable of storing up to 2 TiB. SD cards have also been developed in numerous form factors, such as miniSD and microSD. As used herein, the acronym "SD/MMC" encompasses all these and future versions of the Secure Digital MultiMedia Cards. eMMC and SD/MMC card slots are commonly designed into portable consumer electronics, such as digital cameras and mobile phones, as a means of data storage and transfer.

The Universal Serial Bus (USB) is a specification to establish communication between devices and a host controller. Originally designed for personal computers, the USB is intended to replace many varieties of serial and parallel ports. For example, USB connects many computer peripherals such as mice, keyboards, digital cameras, printers, personal media players, flash drives, external hard drives, and the like. Although designed for personal computers, USB has found application in a broad variety of other data communication contexts.

The USB specification has evolved through 3 major revisions. The USB 1.0 specification released in 1996 and updated as USB 1.1 in 1998 introduced Low Speed 1.5 Mbit/s and Full Speed 12 Mbit/s signaling rates. The USB 2.0 specification, released in 2000, added Hi-Speed USB with 480 Mbit/s signaling rate and superseded the USB 1.1 specification. The USB 3.0 specification was released in 2008 and defines an additional SuperSpeed 5 Gbit/s signaling rate using additional wires, separate from the USB 2.0 signaling wires, on an extended SUB connector. To maintain backwards compatibility, SuperSpeed USB controllers and hubs must also include USB 2.0 capabilities and be able to support USB 2.0 and USB 3.0 devices and signaling simultaneously. As used herein, the terms Low Speed, Full Speed, Hi-Speed and SuperSpeed USB have the meaning assigned to them in the USB 2.0 and USB 3.0 specifications, including current and future Engineering Change Notices and addendums, as published by the USB Implementers Forum, Inc. (USB-IF), available at usb.org, and incorporated herein by reference in their entirety.

UniPro (Unified Protocol) is a high-speed interface technology for interconnecting integrated circuits, primarily in mobile phones. UniPro technology provides high-speed data communication (Gbit/s), low-power operation, low pin count, small silicon area, data reliability, and robustness. The theory behind UniPro is the view that the complexity of advanced mobile phones could be reduced by splitting the system design into well-defined functional modules interconnected by a network. Version 1.1 of the UniPro specification was issued in 2009, and is available at http://en.wikipedia.org/wiki/UniPro-cite note-UniPro1.1-2.

Many mobile phones (or more generically herein, mobile platforms) deployed in the field include a USB 2.0 interface, and one or more eMMC or SD/MMC slots. As the USB 3.0 standard is deployed, an increasing number of computers and other devices will be capable of communications at the very high USB 3.0 data rates (5 Gbit/s). Transferring data to and from eMMC and SD/MMC at the high USB 3.0 data rates would be advantageous; however, most existing mobile platforms lack a USB 3.0 interface, and adding one would require extensive redesign and modification.

One proposed solution is to support the data transfer via an external chip, connected to the mobile platform through a UniPro interface, which would access the eMMC or SD/MMC storage memory connected to the external chip, and also transport USB 3.0 traffic. However, this requires a UniPro interface at the platform level. Integration of such an external chip in the mobile platform is complex, and would require extensive software modification. Since all access to the eMMC or SD/MMC cards by the mobile platform would be performed through the UniPro interface, the external chip would have to be fully operational at all times. This would increase power consumption and reduce the lifespan of the mobile platform between battery charges or changes.

SUMMARY

According to one or more embodiments disclosed and claimed herein, memory associated with a mobile communication device, such as memory removably inserted into a memory card slot, may be accessed, in the alternative, by a mobile communication platform or by a remote USB host. A memory access module connected to the memory card slots is operative in one of two modes: a pass-through mode and a USB mode. In the pass-through mode, the memory card slots are directly connected, via switching circuits, to memory interfaces on the mobile communication platform. A USB interface on the mobile communication platform may additionally be connected, in pass-through mode, via a USB hub to a remote USB host. In the USB mode, the memory card slots are connected, via switching circuits, second memory interfaces, and a controller, to a USB hub supporting USB 3.0 and USB 2.0 transfer protocols, and accessible by a remote host.

One embodiment relates to a method of accessing memory associated with a mobile communication device, by a mobile communication platform within the mobile device and, in the alternative, by an external host. In a first mode, the memory is connected to one or more memory interfaces of the mobile platform. In a second mode, the memory is connected to a 3.0 USB hub, the USB hub accessible by the external host.

Another embodiment relates to a mobile communication device operative to store and retrieve data to one or more removable memory modules, and having a USB connection to a remote host. The device includes a mobile communication platform operative to effect wireless communication with at least one remote transceiver, the mobile platform having a first memory interface. The device also includes a memory access module connected in data transfer relationship to at least the first memory interface. The module comprises a second memory interface operative to store and retrieve data to one or more of the removable memory modules; a 3.0 USB hub accessible by an external host; a controller connected to the USB hub and the second memory interfaces; and a switching matrix having two operating modes. In a first mode, the switching matrix is operative to couple the memory interface to the mobile communication platform, and in a second mode, the switching matrix is operative to couple the memory interface to a USB 3.0 port of the USB hub. In the first mode the mobile platform is operative to access one or more of the removable memory modules, and in the second mode one or more of the removable memory modules are accessible via the USB hub for a remote host.

Yet another embodiment relates to a memory access module operative to connect a removable memory module to a mobile communication platform in a mobile communication device or, in the alternative, to an external host. The memory access module includes a memory interface operative to store and retrieve data to the removable memory module; a 3.0 USB hub accessible by an external host; and a controller connecting the USB hub and the second memory interface. The memory access module further includes a switching matrix having two operating modes. In a first mode, the switching matrix is operative to couple the memory interface to the mobile communication platform, and in a second mode, the switching matrix is operative to couple the memory interface to a USB 3.0 port of the USB hub.

Still another embodiment relates to a method of operating a mobile communication device whereby an external host and a mobile communication platform in the device can, in the alternative, access memory associated with the mobile communication device. The method comprises switching between a first mode wherein the memory is in operable connection with a memory interface of the mobile communication platform, and a second mode wherein the memory is in operable connection with a 3.0 USB hub, the USB hub being accessible by the external host.

DETAILED DESCRIPTION

Figure 1:
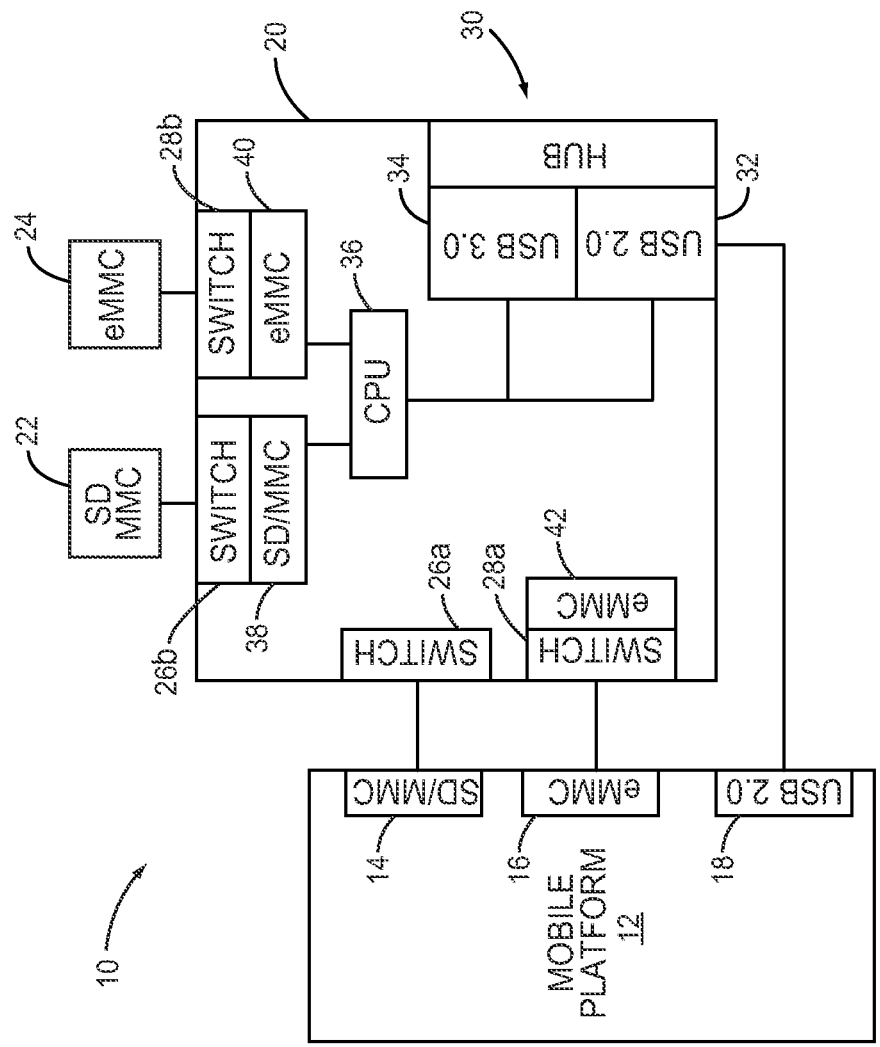
FIG. 1 is a functional block diagram of relevant portions of a mobile communication device, including a mobile communication platform and a memory access module.

FIG. 1 depicts a mobile communication device 10, comprising a mobile communication platform 12 and a memory access module 20. The memory access module 20 is selectively operative to connect external memory, such as eMMC and/or SD/MMC flash drives, to the mobile communication platform 12 or to a USB hub 30 implementing the USB 3.0 data transfer capabilities. This provides an external USB host, such as an attached computer, with access to the eMMC and SD/MMC memories at USB 3.0 SuperSpeed, as well as access to the mobile communication platform 12 at USB 2.0 supported data transfer speeds. When an external USB host is not attached (or is not active), the memory access module 20 connects the eMMC and SD/MMC flash drives directly to corresponding eMMC and SD/MMC interfaces 16, 14 on the mobile platform 12, in a pass-through mode that consumes negligible power and introduces negligible delay on the memory access operations.

As used herein, a mobile communication platform, or mobile platform, denotes a functional module or unit operative to effect wireless communication with at least one remote transceiver. Typically, a mobile platform 12 includes a wireless modem, or transceiver, operative to transmit and receive radiofrequency (RF) modulated signals representing voice and data communications according to one or more known protocols (e.g., UMTS, GSM, LTE, or the like). The mobile platform 12 may additionally include a processor, such as a digital signal processor (DSP), operative to encode/decode the voice and data communications as required by the operative protocol(s), local memory, and/or other circuits as required to effect the wireless communication.

The mobile communication platform 12 depicted in FIG. 1 includes interfaces 14, 16 to removable data storage devices, such as flash memory drives. In particular, the mobile platform 12 includes a Secure Digital/MultiMedia Card (SD/MMC) interface 14, and embedded MMC (eMMC) interface 16. The interfaces 14, 16 are electrical and logical interfaces that implement, and hide from the mobile platform 12, the low level data formatting and timing operations necessary to access flash memory in removable MMC cards. The interfaces 14, 16 are operative to be connected to contacts in a physical interface, such as a card slot 22, 24, respectively, deployed in a mobile communication device 10 to accept, and read from, and write to removable SD/MMC and eMMC memories.

The mobile communication platform 12 further includes a USB 2.0 interface operative to exchange data with a USB hub or host device according to known USB protocols, including data communications at low speed, full speed, and Hi-speed, as those terms are defined in the relevant USB specifications.

As depicted in FIG. 1, the mobile communication device 10 further comprises a memory access module 20, electrically and logically connected to the mobile platform 12 via one or more memory interfaces 14, 16, and via the USB 2.0 port 18. Memory card slots 22, 24 are electrically and logically connected to the memory access module 20. As those of skill in the art will readily appreciate, the memory access module 20 may be tightly integrated with the mobile platform 12, such as occupying the same printed circuit board (PCB), or integrated on the same integrated circuit (IC) chip. Alternatively, where a mobile platform 12 exists as a stand-alone ship or board, the memory access module 20 may be implemented on a separate chip or board, with the memory interfaces 14, 16 and USB 2.0 port 18 electrically connected as indicated in FIG. 1. The latter case may be particularly advantageous in bringing USB 3.0 SuperSpeed data transfer capability to mobile communication devices 10 incorporating a legacy mobile communication platform 12, having a USB 2.0 (or earlier) interface.

As described further herein, the memory access module 20 operates in one of two mutually exclusive modes: pass-through mode and USB mode. The memory access module 20 includes switching circuits 26, 28 (depicted as 26a, 26b and 28a, 28b) operative to connect the memory interfaces 14, 16 of the mobile platform 12 to memory card slots 22, 24, respectively, in pass-through mode. The memory access module 20 additionally includes memory interfaces 37, 39 (corresponding generally to the memory interfaces 14, 16), a controller 36, and a USB hub 30 implementing the USB 3.0 protocol. These circuits are active during USB mode, when a remote USB host may access the memory card slots 22, 24 via the controller 36 and memory interfaces 37, 39. A status register 42 controls the operating mode of the memory access module 20. In one embodiment, as depicted in FIG. 1, the status register 42 may emulate an eMMC memory location, and is accessed by the mobile platform 12 via the eMMC memory interface 16.

Figure 2:
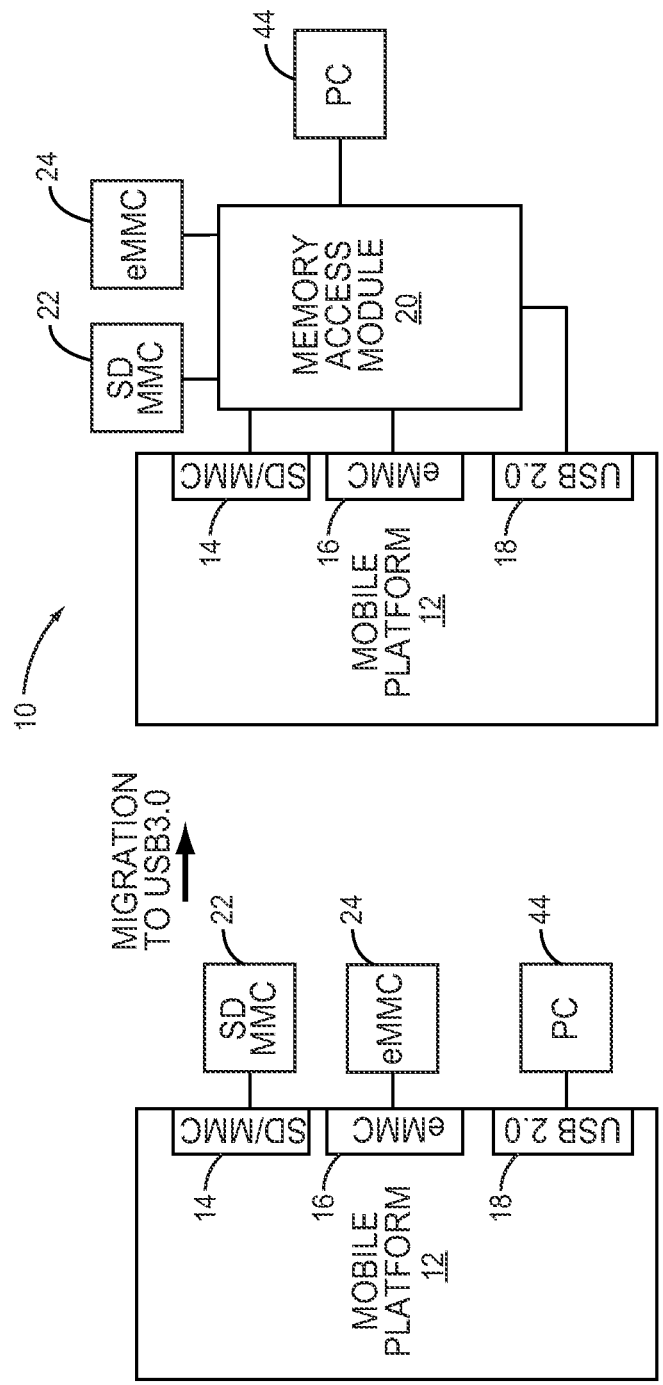
FIG. 2 is a functional block diagram depicting the migration from a conventional mobile platform, depicted in FIG. 2A, to a mobile platform integrated with a memory access module, depicted in FIG. 2B.

FIG. 2 depicts the migration of a legacy mobile communication platform 12, depicted in FIG. 2A, to an integrated solution comprising the mobile platform 12 and a memory access module 20, according to embodiments of the present invention, as depicted in FIG. 2B. In FIG. 2A, the SD/MMC interface 14 on the mobile platform 12 is connected to a physical SD/MMC card slot 22, which may receive, read from, and write to an SD/MMC memory card. Similarly, the eMMC interface 16 on the mobile platform 12 is directly connected to an eMMC card slot 24. Finally, the USB 2.0 interface 18 on the mobile platform 12 may be directly connected to an external USB host, such as a personal computer (PC) 44. The legacy mobile communication platform 12 of FIG. 2A is representative of the communication portion of many existing mobile communication devices, such as cellular telephones, smartphones, PDAs, portable computers, and the like, and is also representative of numerous legacy designs that will be incorporated into newer generations of such devices.

Modern mobile communication devices 10 transmit, receive, store, retrieve, and display/render content (e.g., graphics, images, audio, video, and the like) represented and stored as digital data, which may be quite voluminous. As the USB 3.0 standard is more widely deployed, users will increasingly wish to transfer data to and from mobile communication devices 10 using the high data rates of the USB 3.0 SuperSpeed protocol. As depicted in FIG. 2B and further explained herein, the memory access module 20, according to embodiments of the present invention, allows an external host device, such as a PC 44, to transfer data to and from the SD/MMC and eMMC flash memory card slots 22, 24 at SuperSpeed data rates, without requiring a modification to the mobile communication platform 12 (USB mode). When the external USB host 44 is inactive (or disconnected), the memory access module 20 connects the flash memory card slots 22, 24 directly to the memory interfaces 14, 16 of the mobile platform 12, as well as providing data transfer capability to an external USB host 44 via the USB 2.0 interface 18 of the mobile platform 12 (pass-through mode).

Figure 3:
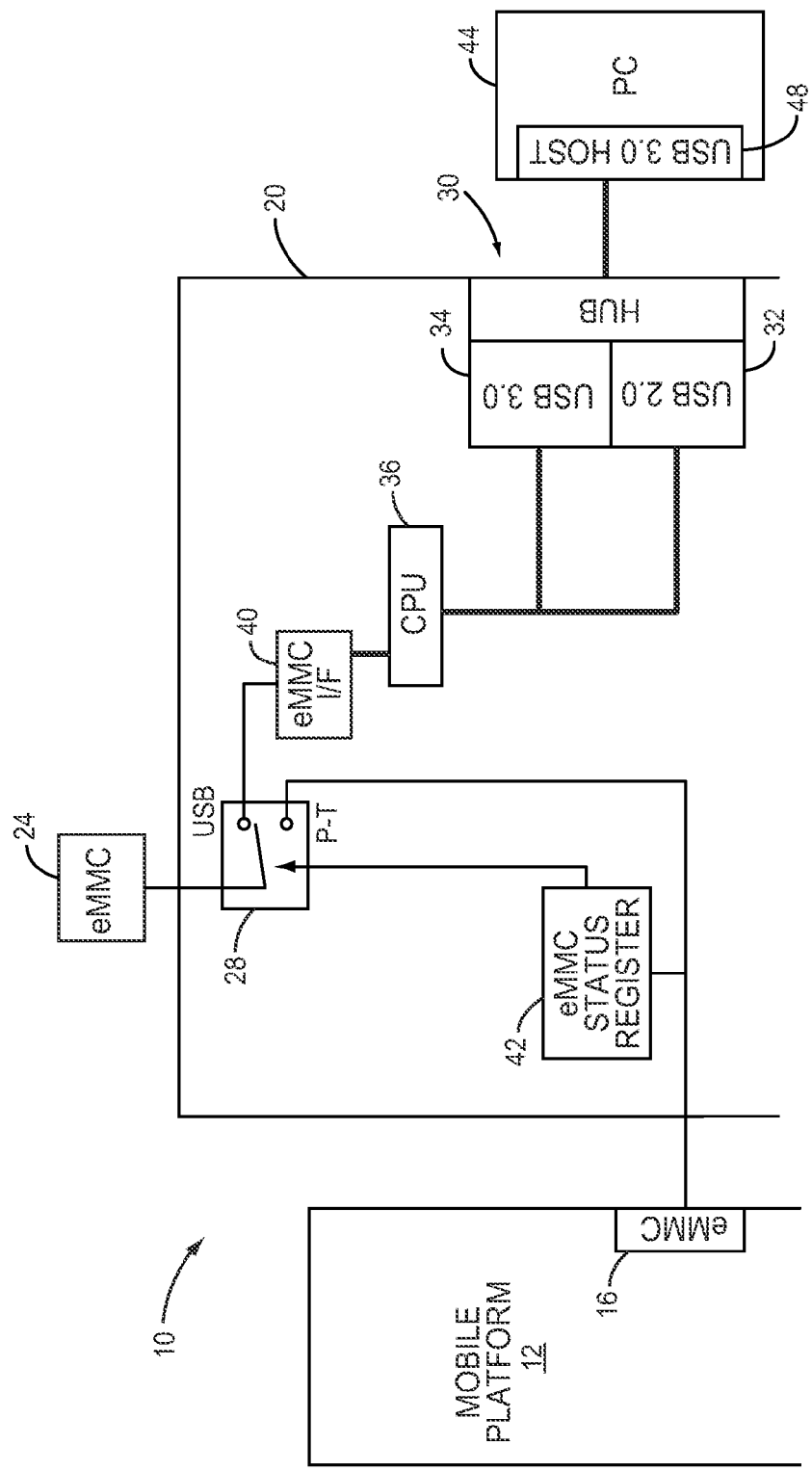
FIG. 3 is a functional schematic diagram depicting the switching action of the memory access module of FIG. 1.

FIG. 3 depicts the operation of switching circuits 26, 28 when the memory access module 20 switches between pass-through mode and USB mode. For clarity, only the eMMC interfaces 16, 40, and switching circuits 28a and 28b connecting them to the eMMC card slot 24, are depicted; SD/MMC interfaces 14, 38 and switching circuits 26a and 26b operate similarly. FIG. 3 functionally represents the switching circuits 28a and 28b as a single, single-pole, dual-throw switch 28. Of course, all switch 28 contact connections are multi-bit buses comprising address, data, and control lines. The switch 28 alternately connects the eMMC flash memory card slot 24 to either the eMMC interface 16 of the mobile platform 12, in pass-through mode, or the eMMC interface 40 of the memory access module 20, in USB mode.

The memory access module 20 operating mode (and hence the position of the switch 28) is controlled, in one embodiment, by one or more control bits in a status register 42. The status register 42 may be integrated with other logic, such as on an ASIC, as known in the art. In one embodiment, the status register 42 emulates an eMMC memory location, and is hence easily accessed by the mobile platform 12 via the eMMC memory interface 16. In this embodiment, the memory access module 20 is a "slave" device operating under the control of the "master" mobile platform 12. Those of skill in the art will readily recognize, however, that the status register 42 (or other mode control mechanism) may be under the control of the controller 36, a central processor of the mobile communication device 10 (not shown), or other control function.

As FIG. 3 indicates, when the memory access module 20 is in pass-through mode, the external flash memory card slot 24 is electrically and logically connected directly to the eMMC memory interface 16. Accordingly, in the pass-through mode, the memory access module couples the flash memory card slots 22, 24 to memory interfaces 14, 16, respectively, with negligible delay or power consumption. Additionally, the USB 2.0 interface 18 of the mobile platform 12 is connected to a USB 2.0 port 32 of the USB hub 30, allowing connection to an external USB host 44 via any USB 2.0 supported protocol. Thus, in pass-through mode, the mobile communication platform 12 operates very nearly as if the memory access module 20 were not present.

FIG. 3 also indicates that when the memory access module 20 is in USB mode, the external flash memory card slot 24 is electrically and logically connected to the eMMC interface 40. The eMMC interface 40—like the eMMC interface 16—performs low-level data formatting and organization tasks, hiding the complexity of the eMMC flash memory interface from the controller 36. The controller 36 executes USB programs to handle the USB Multimedia Transport Protocol (MTP) and Mass Storage Classes of data transfers from the USB 3.0 port 34 of the USB hub 30. Note that the USB 2.0 port 32 is also attached (the USB 3.0 physical wiring specification is a superset of the wires required for USB 2.0 data transfers). Accordingly, the memory access module 20 may also operate in USB mode when an external USB host 44 supports only USB 2.0 Legacy Class transfers, albeit without the advantage of USB 3.0 SuperSpeed data transfer rates.

Figure 4:
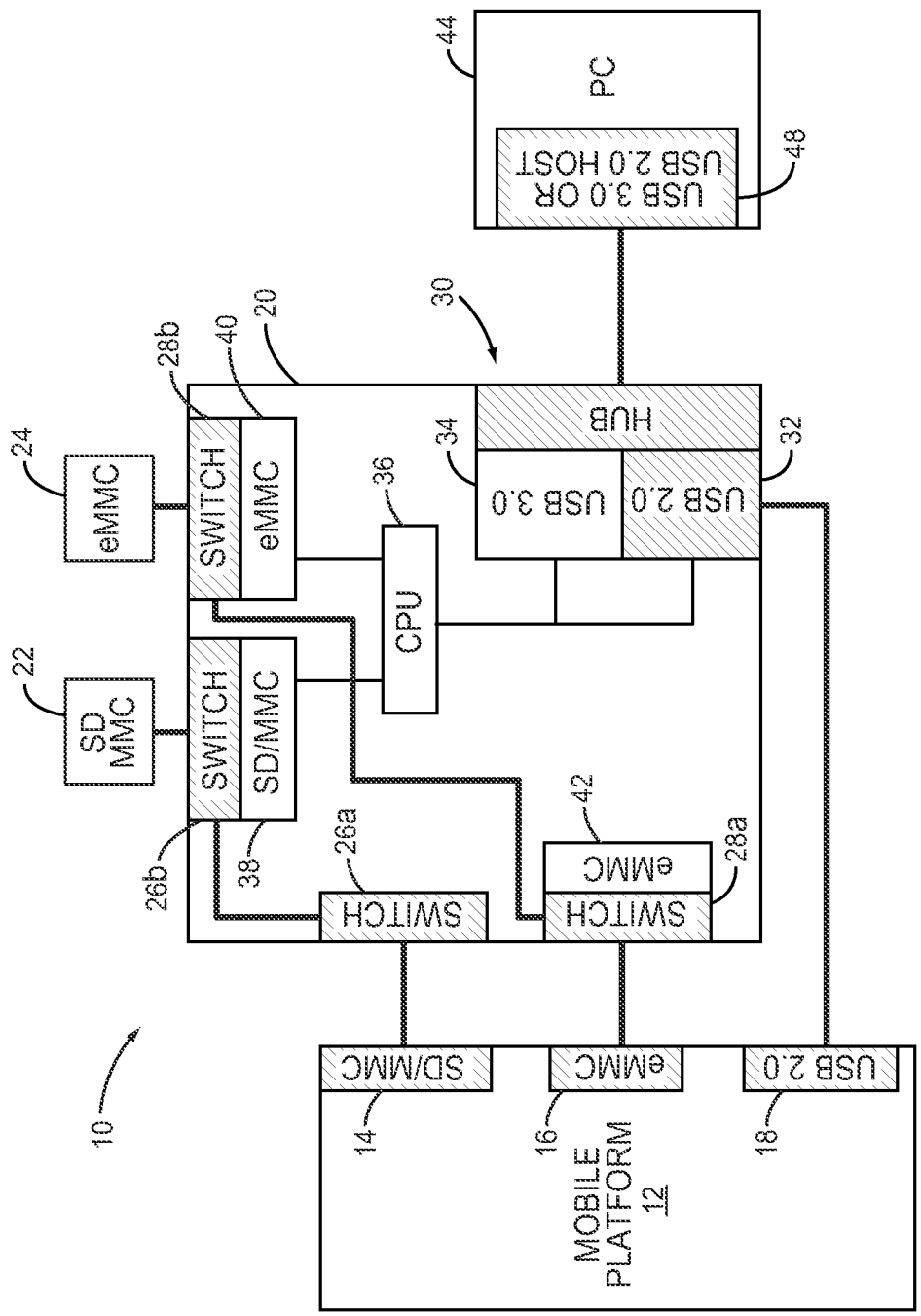
FIG. 4 is a functional block diagram depicting the data path of the memory access module of FIG. 1 in pass-through mode.

FIG. 4 depicts the data paths through the memory access module 20 in pass-through mode. The memory interfaces 14, 16 connect via switching circuits 26, 28 directly to the external flash drive memory card slots 22, 24, respectively. Through this path, the mobile platform 12 may transfer data to and from flash memory in external flash card slots 22, 24 of the mobile communication device 10 as if the card slots 22, 24 were directly connected to the memory interfaces 14, 16. In this mode, a USB host 48 in, e.g., a PC 44 may access the mobile platform 12, via the USB 2.0 port 32 of the USB hub 30.

Figure 5:
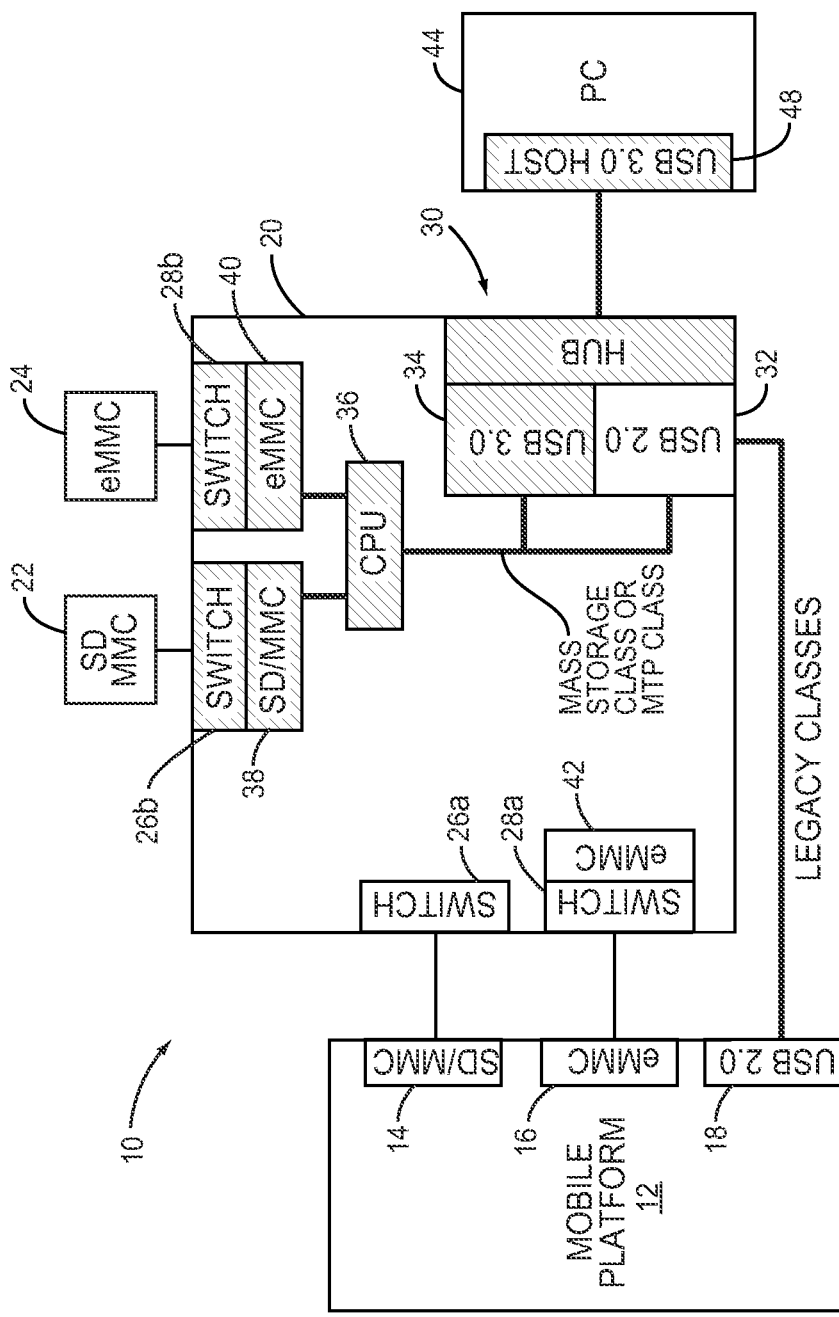
FIG. 5 is a functional block diagram depicting the data path of the memory access module of FIG. 1 in USB mode.

FIG. 5 depicts the data paths through the memory access module 20 in USB mode. The USB 3.0 host 48 in, e.g., a PC 44 connects to the USB hub 30. The USB 3.0 port 34 connects, via the controller 36, to the external flash drive memory controllers 38, 40. These memory controllers are connected via switching circuits 26b, 28b to the flash drive memory card slots 22, 24. Through this path, the external host PC 44 may transfer data directly to and from flash memory in flash card slots 22, 24 of the mobile communication device 10 at USB 3.0 SuperSpeed data transfer rates (or any lower USB supported data rate). In this mode, the external host PC 44 may also access the USB 2.0 interface 18 of the mobile platform 12 via the USB 2.0 port 32 of the USB hub 30. This path supports all USB legacy classes and data rates.

Figure 6:
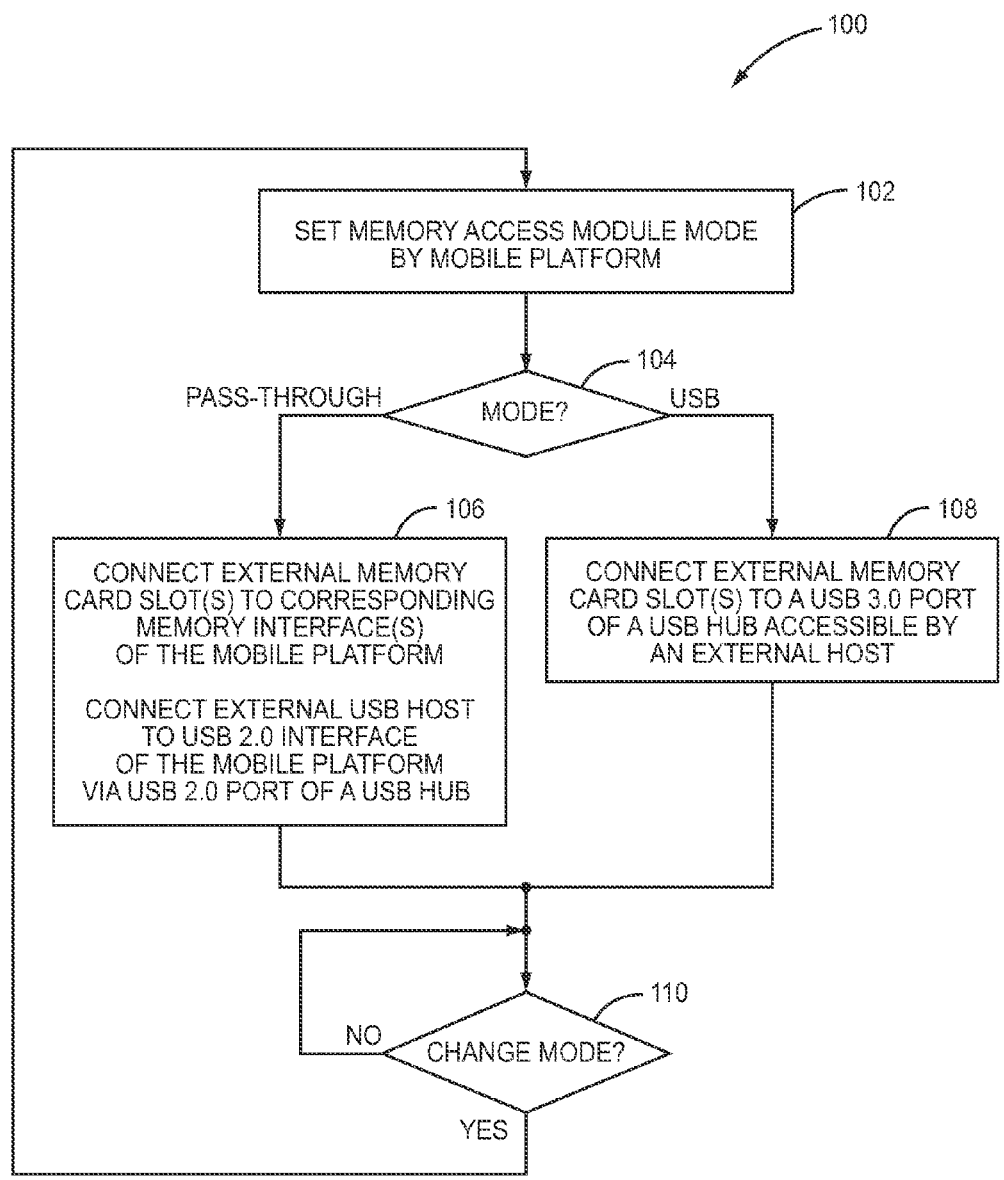
FIG. 6 is a flow diagram of a method of accessing memory associated with a mobile communication device.

FIG. 6 depicts a method 100 of accessing memory in card slots 22, 24 of a mobile communication device 10, by the mobile platform 12 within the mobile device 10 and, in the alternative, by an external host 44. An operating mode of a memory access module 20 within the mobile device 10 is set (block 102). In one embodiment, the mode is one of "pass-through" and "USB," and may be set by the mobile platform 12. In one embodiment, the mobile platform 12 sets the operating mode by writing one or more status bits to a status register 42, which may be integrated with circuits on the memory access module 20. In one embodiment, the status register 42 may emulate an eMMC memory location, and hence the mobile platform 12 writes the status bit(s) via an eMMC memory interface 16.

If the memory access module 20 is in pass-through mode (block 104), it connects external card slot(s) 22, 24 to the corresponding memory interface(s) 14, 16 of the mobile platform 12 (block 106). Additionally, in pass-through mode, the memory access module 20 may connect an external USB host to a USB interface 18 of the mobile platform 12 (block 106). In one embodiment, the USB interface 18 is a USB 2.0 interface.

Alternatively, if the memory access module 20 is in pass-through mode (block 104), it connects external card slot(s) 22, 24 to a USB hub 30, which is accessible by an external host 44. In one embodiment, a controller 36 and appropriate memory interfaces 38, 40 are interposed between the USB hub 30 and the external card slot(s) 22, 24. In one embodiment, the external card slot(s) 22, 24 are connected to a USB 3.0 port of the USB hub 30, and the controller 36 is operative to implement USB 3.0 data transfer protocols, such as SuperSpeed data transfers.

When a data transfer operation is complete, or a different operating mode is otherwise required or desired (block 110), the memory access module operating mode may be changed (block 102).

According to embodiments of the present invention, USB 3.0 class data transfers are possible between an external USB host 44 and flash memory card slot(s) 22, 24 of a mobile communication device 10, even when the mobile platform 12 in the device 10 has only a USB 2.0 interface. The solution, in pass-through mode, imposes almost no hardware or operational constraints (delay, power consumption, or the like) on accesses through the memory interfaces 14, 16, and has minimal software impact on the legacy mobile platform 12.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A mobile communication device operative to store and retrieve data to one or more removable memory modules, and having a USB connection for connecting to a remote host via at least first and second revisions of the USB specification, the second revision supporting higher bandwidth data transfer than the first revision, the device comprising:
   a mobile communication platform operative to effect wireless communication with at least one remote transceiver, the mobile platform having a first memory interface; and
   a memory access module connected in data transfer relationship to at least the first memory interface, the memory access module comprising
      a second memory interface operative to store and retrieve data to one or more of the removable memory modules;
      a USB hub supporting at least the second revision accessible by an external host;
      a controller connecting the USB hub and the second memory interface; and
      a switching matrix having two operating modes, wherein in a pass-through mode, the switching matrix is operative to couple the second memory interface to the first memory interface of the mobile communication platform, and wherein in a USB mode, the switching matrix is operative to couple the second memory interface to a USB port of the USB hub supporting the second revision;
      wherein in the pass-through mode the mobile platform is operative to access one or more of the removable memory modules, and wherein in the USB mode one or more of the removable memory modules are accessible via the USB hub for a remote host.

2. The device of claim 1 wherein the mobile platform further comprises a USB port, and wherein the mobile platform USB port connects to a USB port of the USB hub.

3. The device of claim 2 wherein the mobile platform USB port supports the first revision, and wherein it connects to a USB port of the USB hub that supports the first revision.

4. The device of claim 1 further comprising a status register operative to control an operating mode of the switching matrix.

5. The device of claim 4 wherein the mobile communication platform is operative to write the status register via the first memory interface.

6. The device of claim 1 wherein at least one removable memory module comprises a removable embedded MultiMedia Card (eMMC) and the first memory interface comprises an eMMC interface.

7. The method of claim 1 wherein at least one removable memory module comprises a removable Secure Digital MultiMedia Card (SD/MMC) and the first memory interface comprises an SD/MMC interface.

* * * * *